United States Patent Office 2,751,325
Patented June 19, 1956

2,751,325
MERCURIAL DIURETIC COMPOSITIONS AND METHOD OF STABILIZATION

Gerhard R. Wendt, Philadelphia, Pa., assignor, by mesne assignments, to American Home Products Corporation, New York, N. Y., a corporation of Delaware No Drawing. Application December 20, 1952, Serial No. 327,155

9 Claims. (Cl. 167—71)

This invention relates to the stabilization of aqueous solutions of mercurial diuretics and to the resulting stabilized solutions. More particularly it relates to the stabilization of aqueous solutions of water-soluble diuretics containing an —Hg—S—X group in which one Hg bond is connected to a terminal carbon atom of a substituted propylene chain and X represents a residue of thioglycolic acid attached to the rest of the molecule through linkage of the sulfhydryl sulfur with the mercury atom, and of solutions of their sodium and other non-toxic water-soluble salts, by introducing into the solution a limited amount of an aliphatic nitrogen acetic acid compound selected from the class consisting of ethylenediaminetetraacetic acid and nitrilotriacetic acid, and it relates further to solutions so stabilized.

In U. S. Patent No. 2,576,349 Robert A. Lehman has disclosed and patented a series of water-soluble diuretics containing the —Hg—S— group attached by one Hg bond to a terminal carbon atom of a substituted propylene chain. They are in general water-soluble compounds of the formula

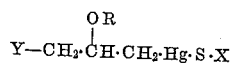

in which Y represents a residue of a water-soluble organic compound with a molecular weight below 1000, R is selected from the group consisting of hydrogen and alkyl radicals containing not more than six carbon atoms and X is defined as covering a wide range of organic radicals. This invention is directed to stabilizing water solutions of those compounds of this group in which X represents a thioglycolic acid residue and of sodium and other non-toxic water-soluble salts thereof, as defined above.

These products have very favorable therapeutic properties and at least one of them has met widespread acceptance for human therapeutic use. They have one drawback, however, namely instability in aqueous solution. Since they are usually administered parenterally, it would be a great advantage if physicians could be supplied with a stable readymade solution which would obviate the necessity of making up a fresh solution from the solid compound before each injection.

It is an object of this invention to provide solutions of these diuretics which are suitable for parenteral administration and have sufficient stability to permit their manufacture, storage and dispensing.

Ethylenediaminetetraacetic acid, which I abbreviate to EDTA has previously been used to stabilize various chemicals, including pharmaceuticals, because of its metal-ion-"sequestering" power, i. e. its ability to form complexes with certain metals in which the metal is no longer ionized. Thus it can protect those products which are sensitive to such metal ions.

In the present case the instability of solutions of these diuretics is a more complex affair of unknown mechanism. It is not a matter of simple catalysis by metal ions since some of the most effective ion-sequestering agents, as will be shown below, are without protective effect. Of the numerous protective agents I have investigated, only two, nitrilotriacetic acid $$N:(CH_2CO_2H)_3$$

and ethylenediaminetetraacetic acid

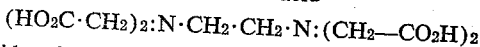

provide effective stabilization, and these must be used within certain concentration limits; too much as well as too little reduces or eliminates the protective action.

According to my invention I introduce into aqueous solutions of the diuretics from approximately 0.001 to approximately 0.5 percent, preferably from 0.001 to 0.05 percent ethylenediaminetetraaminetetraacetic acid (EDTA), or approximately 0.1 percent nitrilotriacetic acid (NTA), the percentage being expressed in metric units of weight per volume of solvent, at a pH value in the range of approximately 8 to approximately 9.5, the preferred range being 9.0 to 9.5. The effective concentration range of NTA is thus narrow as compared with that of EDTA. Greater or less amounts of protective agent diminish the protective effect. The concentration of the diuretic may range from 3.0 to 25.0 percent.

One form of the mercurial diuretics described above that has met with wide acceptance has the following formula:

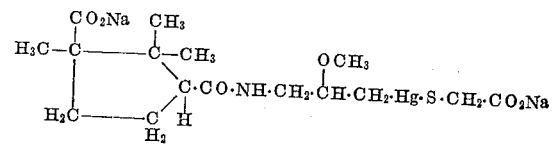

This is at present sold under the trade name "Thiomerin."

Compounds of this type decompose in aqueous solution by hydrolysis of the Hg—S bond, yielding as one hydrolytic product thioglycolic acid. The latter is readily oxidized to dithioglycolic acid, the oxidation being accelerated by numerous agents and conditions. One important factor in hydrolysis is the so formed dithioglycolic acid which acts catalytically to accelerate the oxidation of thioglycolic acid. (Harrison, Biochem. J., 21, 1407–1410). Traces of copper also have an adverse effect. While I do not wish to bind myself to the following mechanism of decomposition of the mercurial diuretics under consideration, it appears probable that it involves the following reactions, in which R represents the camphoramyl methoxypropyl portion of the thioglycolic compound.

Table 1

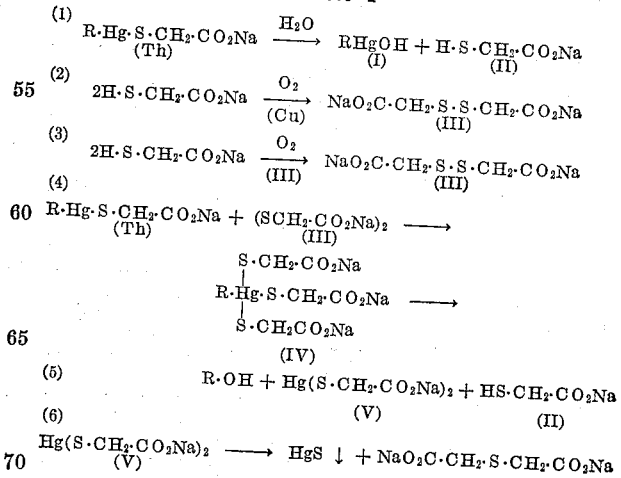

Decomposition of the diuretic in aqueous solution is indicated by the formation of a precipitate which is usually black but sometimes yellow turning to black. The black precipitate is mercuric sulfide.

The mercurial diuretics described above, unless highly purified contain traces of metallic impurities. One sample, for example, was found to contain the following:

*Table 2*

|  | P. P. M. |
|---|---|
| Ca, Mg, Al, Fe | 1–5 |
| Si | 10–20 |
| Cu | <1 |

Traces of mercury and mercurous compounds may be present in the early stages of synthesis of the diuretics but are removed in the later stages.

Experiments in which metals were added to the diuretic solution showed that Fe and Si had no effect on stability but that Ca, Mg and Cu decreased stability. (See Reaction 2 above.) From this it might be throught that the protective effect of NTA and EDTA was due to a simple sequestering or deionizing of these metal ions. That this is not so, however, is shown by the facts that 1,2-diaminocyclohexane-N,N'-tetraacetic acid, one of the most effective copper-sequestering agents, is entirely without protective action, and that NTA and EDTA are only effective in a restricted concentration range. Furthermore the following sequestering agents fail to protect the solutions against decomposition: iminodiacetic acid, 8-hydroxyquinoline, 2,3-butanedioneoximethiosemicarbazone, nitrosoresorcinol, tetrasodium pyrophosphate and hexasodium tetraphosphate.

In the above outlined chain of decomposition reactions, Reaction 3 is autocatalytic, the reaction product III, dithioglycolic acid, accelerating the oxidation and thus the hydrolysis of Reaction 1 by removing the initial product II, thioglycolic acid, from the sphere of reaction. The addition of dithioglycolic acid III, by mass action, tends to inhibit the hydrolysis Reaction 1 by repressing the oxidation of thioglycolic acid II, but this action is ineffective to overcome its catalytic accelerating effect on the oxidation of Reaction 3. The net effect is to activate the hydrolysis of the diuretic Th. This adverse effect of dithioglycolic acid has been proved experimentally by adding dithioglycolic acid (as the disodium salt) to solutions of compound Th, Reaction 1, Table 1, and observing the decreased stability which resulted.

These observations raise the question of the mechanism of the protective action of NTA and EDTA. These agents undoubtedly inhibit the catalytic effect of copper to some extent, but this is not the whole story in view of the ineffectiveness of 1,2-diaminocyclohexane-N,N'-tetraacetic acid, an effective copper-sequestering agent. Numerous other possibilities exist. In view of the small amount needed, they do not act by forming stable complexes with the diuretic, e. g. compound Th in Table 1. If, however, compound Th must be transformed into some equilibrium form Th' before hydrolysis, it is possible that the NTA or EDTA forms a non-hydrolyzing complex with this equilibrium form and thus inhibits the hydrolysis. Or these protective agents may form complexes with dissolved oxygen in the aqueous medium thus inhibiting the oxidation of thioglycolic acid to dithioglycolic acid and slowing down or preventing Reactions 2–6. Furthermore the stability and composition of the complexes formed by the sequestering agents undoubtedly are a factor in stabilization. For example, 1,2-diaminocyclohexane-N,N'-tetraacetic acid apparently forms a complex containing both copper and thioglycolic acid which is more catalytically destructive of the diuretic Th than is copper alone. I have shown experimentally that solutions deteriorate more rapidly in the presence of copper and 1,2-diaminocyclohexane-N,N'-tetraacetic acid than in the presence of the latter compound alone.

The following examples illustrate the stabilizing effect of NTA and EDTA on aqueous solutions of the mercurial diuretics described above by means of representative experimental data and also illustrate a preferred embodiment of my invention adapted to therapeutic use. These examples are intended to be illustrative only and not to limit my invention, the scope of which is defined in the appended claims.

In the comparative tests of Examples 1–5, accelerated decomposition was effected by storing the solutions at 50°–53° C. until decomposition was evident from the formation of a precipitate, the relative stability being shown by the length of time required to reach this point. Since practical storage temperatures may be taken to range, say, from 15° to 30° C., usually 20° to 25° C., the stable life of the solutions under practical conditions will be much longer than that at 50° C. The stable life of the diuretics at 22° C. can be conservatively estimated as 20 times that at 50° C.

The test solutions were prepared by dissolving EDTA in the form of its disodium salt in water and the free acid of NTA in dilute sodium hydroxide. The pH was adjusted to 8 with dilute sodium hydroxide. To 2 cc. of these solutions 242 mg. of the camphoramyl . . . thioglycolate compound Th was added. The pH was then in the range 9.0–9.5.

EXAMPLE 1

*Table 3*

[Stability of different samples of aqueous solutions of 242 mg. compound Th in 2 ml. at 50° C.]

| Code: | Days |
|---|---|
| 22 B | 12 |
| 34 A | 11 |
| 78 A | 11 |
| 54 A | 13 |
| C | 4½ |
| W | 5½ |

EXAMPLE 2

*Table 4*

[As in Example 1 with various additives.]

| Code | Additive | EDTA, percent | Days |
|---|---|---|---|
| 27 A | Hg | | <1 |
| 22 B | Fe [1]—13 mg | | 12 |
| 22 B | Fe(OH)₃—0.001% | | 12 |
| 22 B | Na₂SiO₃—0.001% | | 12 |
| 23 A | DSTG [2]—9 mg | | 2–3 |
| 23 A | DSTG—11 mg | 0.05 | 4 |
| 23 A | DSTG—9 mg | 0.01 | 4 |

[1] Powered metallic iron, 100 mesh.
[2] DSTG=disodium dithioglycolate.

EXAMPLE 3

*Table 5*

[As in Example 1,[1] with EDTA.]

| Code | EDTA, percent | Days |
|---|---|---|
| 22 B | 0.001 | 19–24 |
| 22 B | 0.01 | 19–29 |
| 34 A | 0.01 | 17–19 |
| 78 A | 0.01 | 28 |
| 78 A | 0.05 | 28 |
| 78 A | 0.1 | 21 |
| 22 B | 0.5 | 15 |
| 22 B | 0.56 | 8 |
| 22 B | 5.6 | 3 |

[1] In these tests the temperature rose for a short time to 53° C.

EXAMPLE 4

Table 6

[As in Example 1, with NTA.]

| Code | NTA, percent | Days |
|---|---|---|
| 34 A | 0.001 | 10 |
| 34 A | 0.01 | 10 |
| 34 A | 0.1 | 15-16 |
| 34 A | 1.0 | 8 |

EXAMPLE 5

Table 7

[As in Example 1 with effective and ineffective sequestering agents.]

| Code | Agent | Percent | Days |
|---|---|---|---|
| 34 A | None | | 11 |
| 34 A | EDTA | 0.01 | 17-19 |
| 34 A | NTA | 0.1 | 15-16 |
| 34 A | IDA [1] | 0.001 | 10 |
| 34 A | IDA | 0.01 | 9 |
| 34 A | IDA | 0.1 | 9-10 |
| 34 A | IDA | 0.5 | 1 |
| 34 A | IDA | 1.0 | 1 |
| 34 A | DACHTA [2] | 0.0001 | 11 |
| 34 A | DACHTA | 0.001 | 9-10 |
| 34 A | DACHTA | 0.01 | 6-7 |
| 34 A | DACHTA | 0.1 | 4-5 |
| 34 A | NRS [3] | 0.001 | 11 |
| 34 A | NRS | 0.01 | 11 |
| 34 A | NRS | 0.05 | 13-14 |
| 34 A | NRS | 0.1 | 11-12 |
| 34 A | HQ [4] | 0.05 | 7 |
| 34 A | HQ | 0.1 | 4 |
| 34 A | BOT [5] | 0.001 | 11-12 |
| 34 A | BOT | 0.01 | 10 |
| 34 A | HTP [6] | 0.001 | 10-11 |
| 34 A | HTP | 0.01 | 10-11 |
| 34 A | HTP | 0.05 | 9-10 |
| 34 A | HTP | 0.1 | 9 |
| 34 A | TSP [7] | 0.001 | 10-12 |
| 34 A | TSP | 0.01 | 11 |
| 34 A | TSP | 0.05 | 10 |
| 34 A | TSP | 0.1 | 9-10 |

[1] IDA=iminodiacetic acid.
[2] DACHTA=1,2-diaminocyclohexane-N,N'-tetraacetic acid.
[3] NRS=nitrosoresorcinol (1,2,4).
[4] HQ=8-hydroxyquinoline.
[5] BOT=2,3-butanedioneoximethiosemicarbazone.
[6] HTP=hexasodium tetraphosphate.
[7] TSP=tetrasodium pyrophosphate.

Discussion of Examples 1–5

In evaluating the results of Examples 1–5, it should be borne in mind that, as mentioned above, a conservative factor of at least 20 must be applied to the accelerated ageing tests at 50° C. to convert them to terms of effective stable life at an average storage temperature of 22° C. Thus an extension of stable life of 2 days at 50° C. indicates an extension of over 1 month, viz. at least 40 days, under average conditions. A preparation stable for 25 days at 50° C. will be stable for over a year and 4 months, viz. at least 500 days, at 22° C.

From Example 1 it is evident that aqueous solutions of various lots of the diuretic without a stabilizing agent have an effective life of about 4–12 days at 50° C. The difference is due to different methods of preparation. All the tested lots were therapeutically satisfactory, but the first four were more highly purified.

The results in Example 2 show that iron, ferric hydroxide and silicon as sodium silicate are without deleterious effect. Mercury is highly destructive. Dithioglycolic acid, as the disodium salt, accelerates decomposition, and this acceleration is only slightly inhibited by EDTA.

Example 3 illustrates the effect of EDTA at various concentrations on several lots of the diuretic. Lot 22 B, which in Example 1, has an effective life of about 12 days at 50° C., has its life extended to 19–29 days by 0.001–0.01% EDTA and only to 15 days by 0.5%. Larger amounts of EDTA actually shorten its life. The effective concentration of EDTA is thus 0.001%–0.5%, preferably 0.001%–0.05%.

Example 4, illustrates the comparable effects of NTA. Here it is seen that 0.001% and 0.01% do not extend the stable life of this sample and 1% slightly reduces it. However 0.1% has a stabilizing effect.

In Example 5 the results of tests with sequestering agents that were effective and those that were ineffective protective agents are compared. It is seen that only EDTA and NTA have a substantial favorable effect. When the similarity of structure of NTA with iminodiacetic acid and of EDTA with 1,2-diaminocyclohexane-N,N'-tetraacetic acid is noted, the results are particularly remarkable:

Table 8

| Effective | Ineffective |
|---|---|
| $N\equiv(CH_2 \cdot CO_2H)_3$ | $H \cdot N=(CH_2 \cdot CO_2H)_2$ |
| Nitrilotriacetic acid (NTA) | Iminodiacetic acid (IDA) |
| $CH_2 \cdot N=(CH_2CO_2H)_2$ | $CH \cdot N=(CH_2CO_2H)_2$ |
| $\|$ | $C_4H_8$ |
| $CH_2 \cdot N=(CH_2CO_2H)_2$ | $CH \cdot N=(CH_2CO_2H)_2$ |
| Ethylenediaminetetraacetic acid (EDTA) | 1,2-diaminocyclohexane-N,N'-tetraacetic acid (DACHTA) |

EXAMPLE 6

Preparation of a stabilized therapeutic solution of compound Th

A stock solution is prepared of EDTA·Na₂(disodium ethylenediaminetetraacetic acid) at a concentration of 0.01% in water suitable for injection, and the reaction is adjusted to pH 9.0–9.5 with 0.1 N NaOH. Purified crystalline "Thiomerin" (compound Th, Table 1) is dissolved in this stock solution to yield a mercury content of 42 mg. per ml. The pH is again adjusted to 9.0–9.5 if necessary.

The resulting solution is sterilized by passage through a clean, sterile, all-porcelain bacterial filter and the filtrate is received in a sterile tared bottle. After determination of the mercury content and specific gravity of a representative sample, the solution is diluted to a mercury content of 40 mg. per ml.

This solution, after analytical and bacteriological control, is then filled into sterile amber glass ampules and the ampules capped and sealed with sterile closures.

In these operations aseptic technique is followed and all contact with metals is avoided throughout; containers and filling lines are of glass or are glass-lined and are maintained scrupulously clean to ensure maximum stability of the diuretic.

This preparation has an effective shelf life of over 1 year, viz. 380–480 days, when stored at average temperatures in the range 21–25° C.

In the specification and claims the terms NTA, nitrilotriacetic acid, and EDTA, ethylenediaminetetraacetic acid, are intended to include both the free acids and their non-toxic soluble salts such as the sodium salts. The anions are the effective stabilizing agents, and the particular salt or salts present in the stabilized solutions depend on the neutralizing agents or buffers used in adjusting the reaction of the solutions as well as on the particular salts of the stabilizing agents introduced. The disodium salt of EDTA and the free acid form of NTA have been found the most convenient forms of the stabilizers to use in making up the solutions. Similarly references to the mercurial diuretics in the specification and claims are intended to include their sodium salts and other non-toxic water-soluble salts.

I claim:

1. A stabilized aqueous solution of a water-soluble organic mercurial diuretic containing the grouping —Hg·S— in which one Hg bond is connected to a terminal carbon atom of a substituted propylene chain and the S atom is the sulfhydryl sulfur of a thioglycolic acid residue, which solution comprises from 3.0 to 25.0 percent of the diuretic and a stabilizer selected from the class consisting of nitrilotriacetic acid and ethylenediaminetetraacetic acid, the nitrilotriacetic acid in an amount of about 0.1 percent and the ethylenediaminetetraacetic acid in an amount of 0.001 to 0.5 percent, the solution having a pH value in the range 8–9.5 and the percentages being in terms of grams per 100 milliliters of solvent.

2. A stabilized aqueous solution as defined in claim 1 in which the stabilizer is ethylenediaminetetraacetic acid.

3. A stabilized aqueous solution as defined in claim 1 in which the stabilizer is nitrilotriacetic acid.

4. A stabilized aqueous solution as defined in claim 2 in which the stabilizer is present in an amount from about 0.001 to about 0.1 percent.

5. A stabilized aqueous solution as defined in claim 1 in which the diuretic has the formula

in which Y represents a residue of a water-soluble organic compound with a molecular weight below 1000, R is selected from the group consisting of hydrogen and alkyl radicals containing not more than six carbon atoms and X is a residue of thioglycolic acid and is attached to the rest of the molecule through linkage of the sulfhydryl sulfur atom of thioglycolic acid with the mercury atom.

6. The method of preparing a stable sterile aqueous solution comprising 3.0 to 25.0 percent of a mercurial diuretic containing the grouping —Hg·S— in which one Hg bond is connected to a termnial carbon atom of a substituted propylene chain and the S atom is the sulfhydryl sulfur of a thioglycolic acid residue, which comprises incorporating in the solution a stabilizer selected from the class consisting of nitrilotriacetic acid and ethylenediaminetetraacetic acid in the form of a non-toxic water-soluble salt thereof, the nitrilotriacetic acid in an amount of about 0.1 percent and the ethylenediaminetetraacetic acid in an amount of 0.001 to 0.5 percent, the percentages being expressed in terms of grams per 100 milliliters of solvent, adjusting the solution pH to 8–9.5, filtering the solution through a bacterial filter, and transferring the filtrate aseptically to sterile containers, the entire operation being conducted out of contact with metals.

7. The method as defined in claim 6 in which the stabilizer added is disodium ethylenediaminetetraacetate.

8. The method as defined in claim 6 in which the stabilizer added is nitrilotriacetic acid.

9. The method as defined in claim 7 in which the stabilizer is added in an amount from about 0.001 to about 0.1 percent.

References Cited in the file of this patent

UNITED STATES PATENTS

| | | |
|---|---|---|
| 1,862,896 | Kharasch | June 14, 1932 |
| 2,130,321 | Kharasch | Sept. 13, 1938 |

OTHER REFERENCES

American Perfumer, May 1950, page 389.